United States Patent

Brown

[15] 3,704,347

[45] Nov. 28, 1972

[54] TELEPHONE CABLE RESTORER SYSTEM

[72] Inventor: Robert Warren Brown, Whittier, Calif.

[73] Assignee: General Telephone Company of California

[22] Filed: June 28, 1971

[21] Appl. No.: 157,279

[52] U.S. Cl. .............................179/91 R, 179/175.25

[51] Int. Cl. ...............................................H04m 3/22

[58] Field of Search..179/175.25, 91 R, 175.1, 175.3

[56] References Cited

UNITED STATES PATENTS

| | | | |
|---|---|---|---|
| 605,670 | 6/1898 | Hughes | 179/91 R |
| 812,236 | 2/1906 | Salzmann | 179/91 R |
| 533,785 | 2/1895 | Brooks | 179/91 R |
| 1,039,773 | 10/1912 | McLarn | 179/91 R |
| 1,799,916 | 4/1931 | Mansfield | 179/91 R |
| 2,799,739 | 7/1957 | Lowman | 179/175.25 |
| 2,869,077 | 1/1959 | Houk | 179/175.25 |

*Primary Examiner*—Kathleen H. Claffy
*Assistant Examiner*—David L. Stewart
*Attorney*—Pastoriza & Kelly

[57] ABSTRACT

A method and portable panel structure for carrying out the method serve to restore rapidly telephone service to customers after a telephone cable connecting the customers' lines to a central office has been inadvertently severed. Arbitrary connections from the severed portion of the cable extending from the central office are made to central office jacks in the panel and arbitrary connections from the severed cable portion extending from the customer's premises are connected to customer jacks on the panel. A tester's plug or answer cord together with a voltage source, ringing generator, and test unit are provided in the panel and enable a tester to identify a customer's telephone number and patch the same with one of several patch cords to the proper central office jack thereby immediately restoring service.

2 Claims, 3 Drawing Figures

PATENTED NOV 28 1972 3,704,347

TELEPHONE CABLE RESTORER SYSTEM

This invention relates generally to telephone equipment and more particularly, to a method and portable panel structure for carrying out the method of rapidly restoring customer telephone service after a telephone cable has been inadvertently severed.

BACKGROUND OF THE INVENTION

During construction operations by utility companies other than telephone companies such as water and power departments and even during operations by private construction companies, it is not uncommon for telephone cables running underground or even on poles to become inadvertently severed. Breaking of main telephone cables can also occur, of course, during natural catastrophes such as earthquakes. Such telephone cables often carry several hundred pairs of telephone lines leading from a central office to a distribution box to various customers' premises. Each customer's line which is identified by the customer's telephone number is associated with a unique line extending from the central office. When a main telephone cable is severed, there is no easy means for a repair crew to immediately restore service since it is not known which lines from the central office are associated with the lines from the customers' premises. While a proper identification is ultimately made and the proper lines spliced together or a new section of cable inserted, there are long periods in which the customers' telephones are out of service.

BRIEF DESCRIPTION OF THE PRESENT INVENTION

With the foregoing considerations in mind, it is a principal object of the present invention to provide a method and portable panel structure enabling a very rapid restoring of customer service by a temporary patch cord arrangement whereby telephone service is maintained until such time as a permanent repair of the severed cable can be effected.

More particularly, the portable panel of the present invention for carrying out the method includes a plurality of central office jacks and associated indicator lights to which leads from the side of the severed cable from the central office may be rapidly and arbitrarily connected by means of a tag board. Similarly, there are provided a plurality of customer jacks and associated indicator lights to which leads from the side of the severed cable from the customers' premises are arbitrarily and rapidly connected by a tag board. The panel also includes a tester's plug or answer cord associated with a tester's hand set, a voltage source, a ringing generator, and preferably a simple test meter. The arrangement is such that if a call originates at one of the customer's premises, the tester at the portable panel structure at the site of the severed cable will be apprised by the energization of an indicator lamp for the particular customer's jack involved. The tester then need only plug into the jack with his tester's plug or answer cord and ask the customer his telephone number. With this information, the tester can then plug into an abritrary central office jack which has a dial tone and simply dial the customer's number. An indicator light for the particular central office jack associated with that number will then be energized and the tester can immediately patch the customer's jack to the central office jack and thereby immediately restore service.

The method and panel structure also include means enabling the tester to call out arbitrarily on customers' jacks after determining whether or not a phone is connected to the jack to thereby determine the customer's telephone number and patch to the proper central office jack. Because of the ability of the tester to talk to either a customer or an incoming call to a customer from the central office, emergency situations can be handled expeditiously.

BRIEF DESCRIPTION OF THE DRAWINGS

A better understanding of the invention will be had by now referring to the accompanying drawings, in which.

DETAILED DESCRIPTION OF THE INVENTION

Figure 1:
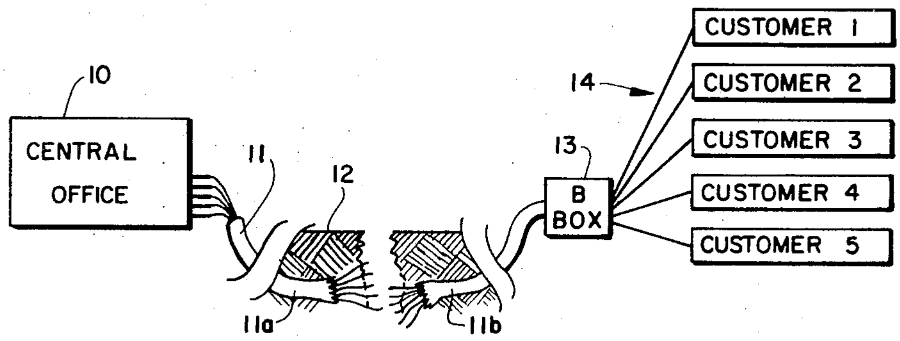
FIG. 1 schematically depicts a central office with an associated cable which has been severed leading to a plurality of customers' premises.

Referring first to FIG. 1 there is shown a central office 10 from which a telephone cable 11 extends under ground 12 to a distribution or B box 13. From the B box individual lines connect to various customers' premises indicated generally by the numeral 14. For the sake of simplicity, only five separate customers' premises are shown but it will be understood that there are pairs of wires for each of the individual telephones and in normal situations there may be several hundred telephones involved.

In FIG. 1, the cable 11 is shown as having been inadvertently severed as might occur during an earth dredging, road construction, or pipe laying operation leaving severed end portions 11*a* and 11*b*.

In accord with the present invention, to restore customer service rapidly there is brought to the site of the severed cable equipment including simple tag boards 15 and 16. Individual wire pairs from the severed cable portion 11*a* extending from the central office may be rapidly and arbitrarily connected to the tag board 15 and similarly individual customer's wire pairs from the severed cable portion 11*b* may be rapidly and arbitrarily connected to the tag board 16. These tag boards terminate in amphonal plugs indicated at 17 and 18 designed to be plugged into a panel structure 19 by mating receptacles 20 and 21 respectively. Again while only a few line pairs have been shown, the panel structure in an actual embodiment would be able to handle up to one hundred pairs from each of the severed cable portions.

As shown, the front of the panel structure includes a plurality of central office jacks 22 with associated indicator lights 23 corresponding in number to the number of pairs of wires connected through the amphonal plug 16 and plug receptacle 20. Similarly, there are provided a plurality of customer jacks 24 and associated indicator lights 25 corresponding in number to the pairs of wires from the customers' premises connected through the amphonal plug 18 and associated plug receptacle 21.

The panel structure 19 also includes an answer cord 26 or tester's plug, a switch means 27 and a reversing switch key 28 on its front face. A plurality of patch cords one of which is indicated at 29 are also available. As will become cleared as the description proceeds, the panel structure 19 internally includes a voltage source, a ringing current generator, and connections for an ohm-meter, these components being interconnected with the switch means and the tester's plug 26.

As described heretofore, it is not possible to tell by visual inspection which customer's pairs of leads and which central office pairs of leads are to be connected. It is known, however, that there is a unique pair of office leads for each pair of customer leads, the same being identified by the customer's telephone number. In accord with the present invention, the panel structure and associated equipment enables a tester at the site to determine the proper leads and effect a quick connection by means of one of the patch cords such as the patch cord 29 between a particular customer jack 24 and a central office jack 22.

Figure 3:
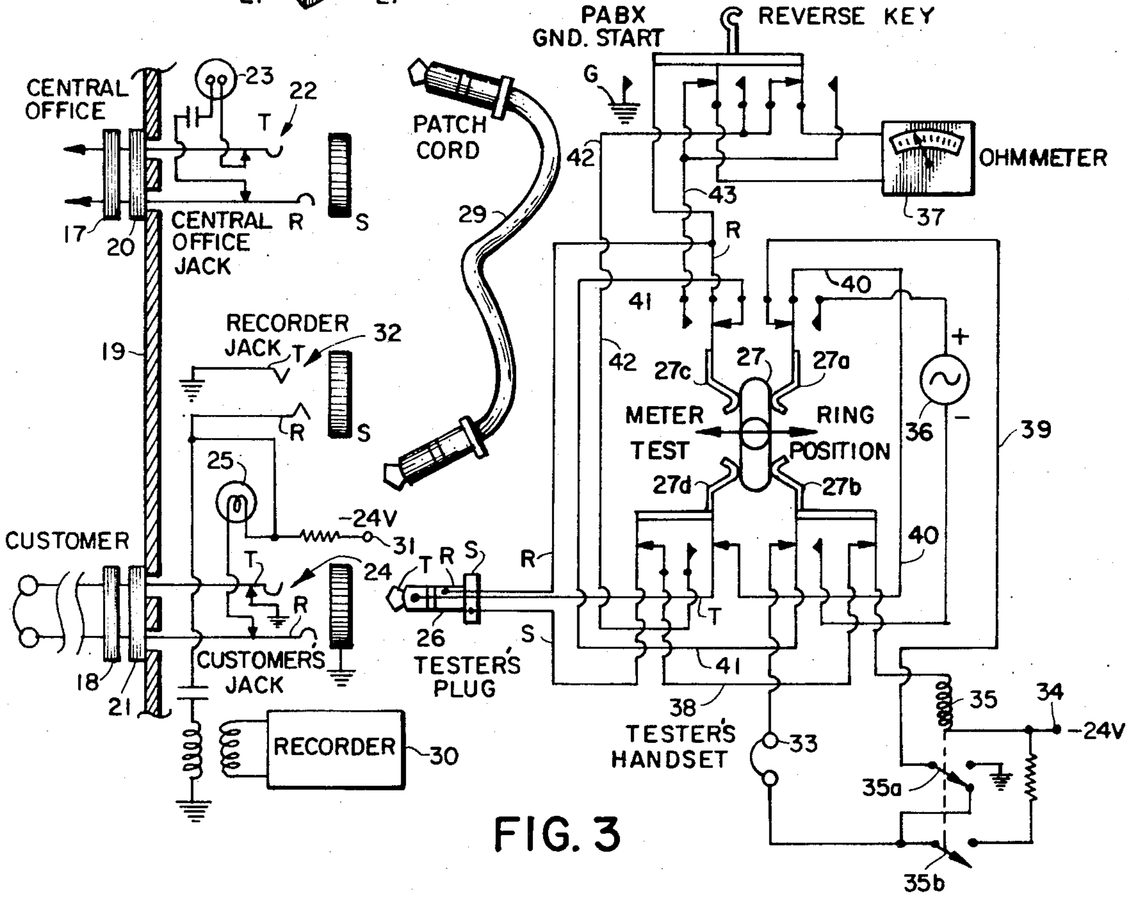
FIG. 3 is a detailed circuit diagram of equipment in the panel structure useful in explaining the operation of the invention.

The manner in which the foregoing is accomplished will be understood by now referring to FIG. 3.

Figure 2:
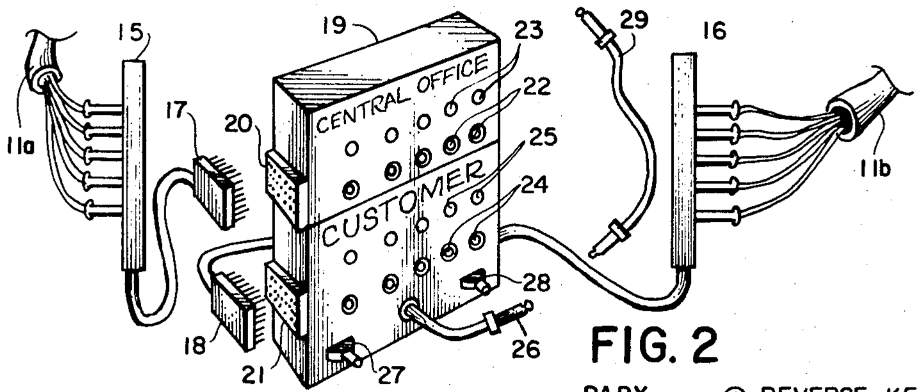
FIG. 2 illustrates a portable panel structure brought to the site of the severed cable to be used in rapidly restoring telephone service.

Various numerals identifying components described in FIG. 2 are used to define the same components in FIG. 3. Thus, one of the typical central office jacks 22 and associated indicator lights 23 is shown as including the usual tip, ring, and sleeve elements T, R, and S. Spring loaded wafer connections between the tip and ring leads connect to the indicator lamp 23 so that any call coming from the central office will energize the lamp 23 and advise the tester of the particular jack 22 on which the call appears. Plugging in of either a patch cord or tester's plug will extinguish the lamp 23 by separating the tip and ring leads from the wafer switches.

The various central office jacks are all identical to the particular jack shown in FIG. 3 and as indicated schematically, there is shown the amphonal plug 17 from the central office connecting to the plug socket 20 in the panel structure 19.

Similarly, the customers' jacks are all the same as shown at 24 and include the usual tip, ring, and sleeve components again designated T, R, and S. In accord with a desirable feature of the present invention, the panel structure 19 includes a recorder 30 shown in the lower left portion of FIG. 3 which may be a simple closed loop tape recorder bearing a message to the effect that telephone service is temporarily out of order. As shown, this recorder connects to each of the customer's jacks 24 through the associated indicator light 25 and will be disconnected from the line when a plug is received in the customers' jack because of separation of the small wafter switches from the tip and ring terminals. A voltage source of —24 volts indicated at the terminal 31 provides energy for the indicator lamp 25 through connection of the tip and ring terminals when the customer attempts a telephone call, the tip terminal being grounded through the wafer switch in the absence of any plug received in the jack as shown. The typical customer's jack 24 illustrated in FIG. 3 connects through the receptacle 21 and amphonal plug 18 to one of the arbitrarily connected pairs of leads from the severed side of the cable leading from the customers' premises. There is illustrated schematically in FIG. 3 a particular customer's telephone connected to the leads associated with the particular illustrated jack 24.

The recorder 30 also includes a plurality of output jacks one of which is indicated at 32 as a convenience so that the tester can patch the recorder to one or more central office jacks so that incoming calls from the central office will receive the recorded message.

The answer cord or tester's plug 26 described in FIG. 2 is shown juxtaposed the customer jack 24 in the lower portion of FIG. 3. This plug includes the usual tip, ring and sleeve connections which are shown connecting to various contacts in the main switch means 27. Also shown in the extreme lower right hand corner of FIG. 3 is a tester's hand set 33 arranged to receive energy from a voltage source 34 and relay switch structure 35 with associated switch arms **35*a* and 35*b*. The other side of the tester's hand set 33 connects through the main switch means 27** to the tester's plug all as will become clearer as the description proceeds.

To the right of the main switch 27 is shown a ringing current generator 36 connected to the main switch such that when the switch is thrown to a ring position, the generator 36 will connect to the tester's plug and provide ringing current to any customer jack within which the tester's plug is inserted. Finally, there is illustrated in the upper right hand portion of FIG. 3 an ohm-meter 37 having its output leads passing through the reversing key switch 28 to connect to the main switch 27 such that when the switch 27 is thrown to a meter test position, the ohm-meter is connected across the tip and ring terminals of the tester's plug. Also shown is a ground designated PABX which will connect to the ring side of the line when the reversing key is moved to the left.

OPERATION

In operation, a repair crew will be immediately dispatched to the site of the severed cable taking with them the control panel 19 of FIG. 2 and appropriate other equipment including tag boards 15 and 16 and extra patch cords. The insulation on each severed portion **11*a* and 11*b* of the severed cable is stripped back and the various pairs of lines are inserted into the tag boards. As mentioned, the insertion can be entirely arbitrary and where the main cable carries several hundred pairs of telephone lines, additional panel structures and tag boards can be used. The amphonal plugs such as 17 and 18 are then plugged into the appropriate receptacles 20 and 21** in the control panel and the tester is then ready to restore service.

Assume first that a customer is attempting to make a telephone call. Immediately the indicator light 25 associated with the particular customer jack 24 will be energized. With particular reference to FIG. 3, the tester will immediately plug in his plug 26 in the lighted customer jack 24. Referring specifically to these components in FIG. 3, it will be evident that when the plug 26 is received in the jack 24, the indicator light 25 as well as the tape recorder 30 will be disconnected as a consequence of separation of the wafer switches. Further, direct contact will be made between the tip and ring conductors as well as the sleeves of the plug and jack respectively. The engaging of the plug sleeve S with the sleeve of the customer's jack places ground on the lead from the sleeves which passes through contacts for switch arm *27d* of the switch means 27 thence through lead 38 to switch contacts for the switch *27b* down through the relay switch coil 35 to the voltage source 34. Thus the voltage source is grounded through the relay and the switch arms *35a* and *35b* will be immediately thrown. Movement of the switch arm *35a* places ground on the switch arm lead 39 passing up through upper contacts of the main switch arm *27a* and thence through lead 40 back through contacts for the switch arm *27d* and to the tip T of the tester's plug thus grounding the tip. Closing of the switch arm *35b* in turn places voltage from the source 34 through the tester's hand set 33 and thence up through contacts on the main switch arm *27b* to lead 41, through contacts on the switch *27c* of the switch 27 to the ring terminal R of the tester's plug so that the tester's hand set is now connected across the tip and ring terminals of the jack 24. The tester can thus answer the incoming call from the customer received on the jack 24.

Upon intercepting this call, the tester will advise the customer of trouble on the line if the customer has not already been advised by means of the tape recorder. He will ask if the customer his telephone number and as soon as this information is received the tester will advise the customer that he will call him back shortly. The tester then removes the plug 26 from the customer's jack and arbitrarily selects one of the central office jacks 22 that is free, that is, on which there is a dial tone. With the tester's plug 26 inserted in a selected central office jack 22, the tester will simply dial by means of his hand set the customer's number. This dialing information is relayed back to the central office and will result in the indicator light associated with one of the central office jacks on the control panel being energized. This energization of the light indicates that the associated central office jack on the panel is connected to the two unique telephone lines associated with the particular number dialed into the central office. The tester then need only utilize one of the patch cords such as the patch cord 29 to patch the customer's jack 24 with the central office jack 22 which central office jack has been identified as that one unique to the particular customer's jack. This particular customer's service is then restored.

It is also possible for the tester to arbitrarily select one of the customer jacks 24 and simply plug in his tester's plug 26. The tester can then throw the switch means arm 27 to the right and as viewed in FIG. 3, it will be noted that this action throws the switch arms *27a* and *27b* to the right thereby connecting the ringing current generator 26 to the switch arms connecting to leads 40 and 41. The lead 40 can be traced directly to the tip T of the tester's plug and the lead 41 can be traced to the ring R through the upper contact of the switch arm *27c* in the main switch 27. Ringing current is thus applied to the customer jack and as soon as the customer answers the phone, the tester will simply ask the customer his telephone number and then find the corresponding central office jack and effect a suitable patching as in the previous case.

In some instances, certain wire pairs from the severed cable portion leading to the customers' premises may not have a telephone on the other end. For example, the telephone service for this particular customer premise may have been removed or not as yet connected. The present invention enables a tester at the broken cable site to determine whether or not a particular customer jack has a telephone connected to the other end. This testing is accomplished by plugging into a customer jack with the plug 26 and throwing the main switch arm 27 to the left. Thus, the switch arms *27c* and *27d* will move to the left thereby placing the tip and ring connections from the tester's plug through lines 42 and 43 and the reversing key switch 28 to the ohm-meter 37. If there is a telephone connected to the particular customer's jack involved, the condenser forming part of the telephone circuitry which normally will have a charge on it will discharge through the ohm-meter thereby causing the needle in the ohm-meter to swing. In the event, however, that the polarity of the condenser is the same as that of the leads to the ohm-meter no discharge will take place. However, by throwing the reversing key 28, the polarity will be reversed so that a discharge can take place and the tester can determine by observing the movement of the ohm-meter needle whether or not a telephone is actually connected. If no phone is connected, there will be no signal on the ohm-meter.

Having determined whether or not a phone is present on the customer's jack being tested, if such a phone is present, the tester can then ring such phone by throwing the switch means 27 to the right as described heretofore and obtain the necessary number information to enable a patch to be completed.

The tester will follow the various procedures outlined above until as many patches as possible have been made.

In the event that there should be an incoming call from the central office to a particular customer, the tester can answer the call by plugging into the energized central office jack on the panel structure. There is no way that the tester can determine which customer jack to patch the incoming call to. However, the tester can advise the incoming caller of trouble on the line and unless the same is an emergency, tell the caller that the trouble will be repaired as soon as possible. Thus, the tester performs the same function as the tape recorder which will automatically advise incoming callers of the situation should the tester be busy with other portions of the panel. In all situations, however, it is desirable for the tester to answer personally all incoming calls from the central office to determine whether or not an emergency is involved. Should the incoming caller state that it is an emergency call, the tester can obtain information as to the address of the customer being called and then send an assistant from the site directly to the address involved to establish the telephone number and thus effect immediate restoration of service.

In the event no dial tone is available on any central office jack then if there are PABX modified lines available, dial tone can be obtained by operating the reverse key to the left to place ground on the tester's plug ring terminal thereby starting the line finder. After a dial tone is obtained the key is released.

From the foregoing description, it will thus be evident that the present invention has provided a rapid and effective apparatus for restoring telephone service pending complete repair of a severed cable.

What is claimed is:

1. A method of rapidly restoring telephone service to customers after a telephone cable connecting the customers' lines to a central office has been inadvertently severed, comprising the steps of:

a. arbitrarily connecting the leads from the side of the severed cable from the central office to a plurality of central office jacks and associated indicator lights on a portable panel structure brought to the site of the severed cable;

b. arbitrarily connecting the leads from the side of the severed cable from the customers' premises to a plurality of customer jacks and associated indicator lights on said panel structure;

c. utilizing a tester's hand set and tester plug powered from a source in said panel structure to either answer an incoming customer call or to call out on an arbitrarily selected customer jack whereby communication is established with a customer;

d. asking the customer on the line his telephone number;

e. thereafter plugging the tester plug into a central office jack on said panel which has a dial tone and dialing the customer's number;

f. observing which of the associated indicator lights for the central office jacks is energized;

g. patching the customer's jack with the energized central office jack to thereby restore service to said customer; and h. repeating the foregoing procedure with additional patch cords until service for all customers is restored.

2. The method of claim 1, including the additional steps of arbitrarily selecting a customer jack on said panel; connection an ohm-meter in said panel to said jack; reversing the polarity of the leads to said ohm-meter back and forth to determine whether there is a customer telephone on the line leading to the selected jack; and thereafter calling out on said jack with a ringing generator in said panel to establish communication with the customer if a determination has been made that a telephone is connected to the jack.

* * * * *